(12) United States Patent
Ryu et al.

(10) Patent No.: US 8,954,460 B2
(45) Date of Patent: Feb. 10, 2015

(54) APPARATUS AND METHOD FOR SCHEDULING USER DEFINED OPERATOR (UDO) IN DATA STREAM MANAGEMENT SYSTEM (DSMS)

(75) Inventors: Seung-Woo Ryu, Seoul (KR); Seok-Jin Hong, Hwaseong-si (KR); Kyoung-Gu Woo, Seoul (KR); Ki-Yong Lee, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/528,292

(22) Filed: Jun. 20, 2012

(65) Prior Publication Data
US 2013/0185321 A1    Jul. 18, 2013

(30) Foreign Application Priority Data

Jan. 18, 2012 (KR) .................. 10-2012-0005844

(51) Int. Cl.
*G06T 17/30* (2006.01)
(52) U.S. Cl.
USPC .......................................... 707/759; 707/718
(58) Field of Classification Search
CPC .............. G06Q 30/08; G06F 17/30864; G06F 17/3064
USPC .................................. 707/759, 718
See application file for complete search history.

(56) References Cited

U.S. PATENT DOCUMENTS

| 7,490,078 | B2 |   | 2/2009 | Lee et al. |   |
|---|---|---|---|---|---|
| 7,805,456 | B2 | * | 9/2010 | Meijer et al. | 707/759 |
| 8,381,233 | B2 | * | 2/2013 | Ali et al. | 719/318 |
| 8,412,896 | B1 | * | 4/2013 | Chellappa et al. | 711/162 |
| 8,442,863 | B2 | * | 5/2013 | Chandramouli et al. | 705/14.43 |
| 2009/0030883 | A1 | * | 1/2009 | Das et al. | 707/3 |
| 2009/0037405 | A1 | * | 2/2009 | Lee et al. | 707/5 |
| 2009/0204551 | A1 | * | 8/2009 | Wang et al. | 705/400 |
| 2010/0281017 | A1 | * | 11/2010 | Hu et al. | 707/718 |
| 2011/0119270 | A1 |   | 5/2011 | Jin et al. |   |
| 2011/0283295 | A1 | * | 11/2011 | Ali et al. | 719/318 |
| 2011/0313844 | A1 | * | 12/2011 | Chandramouli et al. | 705/14.42 |
| 2012/0078951 | A1 | * | 3/2012 | Hsu et al. | 707/769 |

FOREIGN PATENT DOCUMENTS

| KR | 10-2007-0057599 A | 6/2007 |
|---|---|---|
| KR | 10-2007-0080350 A | 8/2007 |
| KR | 10-2010-0114664 A | 10/2010 |
| KR | 10-2011-0055166 A | 5/2011 |

* cited by examiner

*Primary Examiner* — Debbie Le
(74) *Attorney, Agent, or Firm* — NSIP Law

(57) ABSTRACT

An apparatus and a method of optimizing queries through scheduling User Defined Operators (UDOs) in a Data Stream Management System (DSMS), are provided. The apparatus includes a query optimizer configured to receive queries, each of the queries including the UDOs and data streams subject to respective operations of the UDOs, and group the data streams and UDOs into scheduling units, each of the scheduling units including one of the data streams and one of the UDOs. The apparatus further includes a scheduler configured to schedule an execution order in which the scheduling units are executed.

21 Claims, 7 Drawing Sheets

(A) NORMALIZED INFORMATION
ABOUT THE NUMBER OF UDOS FOR EACH QUERY

· Ex) Q1 = {U1, U2, U3}

|  | U1 | U2 | U3 |
|---|---|---|---|
| Q1 | 1 | 1 | 1 |
| Q2 | 1 | 1 | 0 |
| Q3 | 1 | 0 | 1 |
| SUM | 3 | 2 | 2 |
| NORMALIZED VALUE | 1 | 0.6666 | 0.6666 |

(B) NORMALIZED INFORMATION ABOUT THE LENGTHS
OF PATTERNS THAT MATCH QUERIES

· Ex) ABC = 3, AC = 2

|  | S1 | S2 | S3 |
|---|---|---|---|
| Q1 | 3 | 2 | 2 |
| Q2 | 2 | 2 | 2 |
| Q3 | 4 | 3 | 3 |

|  | S1 | S2 | S3 |
|---|---|---|---|
| Q1 | 0.75 | 0.5 | 0.5 |
| Q2 | 0.5 | 0.5 | 0.5 |
| Q3 | 1 | 0.75 | 0.75 |
| SUM | 2.25 | 1.75 | 1.75 |
| NORMALIZED VALUE | 1 | 0.777778 | 0.777778 |

FIG. 5

(A) SELECTIVITY OF PATTERN MATCHING
FOR EACH QUERY OR FOR EACH STREAM

|    | Q1  | Q2  | Q3  | SUM | NORMALIZED VALUE |
|----|-----|-----|-----|-----|------------------|
| S1 | 0.7 | 0.6 | 0.8 | 2.1 | 1                |
| S2 | 0.5 | 0.4 | 0.7 | 1.6 | 0.761905         |
| S3 | 0.5 | 0.4 | 0.2 | 1.1 | 0.52381          |

(B) MEAN EXECUTION TIME FOR EACH UDO (msec unit)

|                   | U1   | U2  | U3  |
|-------------------|------|-----|-----|
| MEAN TIME         | 50   | 200 | 100 |
| NORMALIZED VALUE  | 0.25 | 1   | 0.5 |
| 1-NORMALIZED VALUE| 0.75 | 0   | 0.5 |

APPARATUS AND METHOD FOR SCHEDULING USER DEFINED OPERATOR (UDO) IN DATA STREAM MANAGEMENT SYSTEM (DSMS)

CROSS-REFERENCE TO RELATED APPLICATION

This application claims the benefit under 35 U.S.C. §119 (a) of a Korean Patent Application No. 10-2012-0005844, filed on Jan. 18, 2012, in the Korean Intellectual Property Office, the entire disclosure of which is incorporated herein by reference for all purposes.

BACKGROUND

1. Field

The following description relates to query optimization through scheduling user defined operators (UDOs) in a data stream management system (DSMS).

2. Description of the Related Art

A data stream management system (DSMS) is a system that receives stream data to process queries for the stream data, and that returns the results of the query processing in the form of data streams. Queries processed by the DSMS are in the format of continuous queries for stream data, are registered once, and are then continuously-executed with continuously-received stream data, unlike on-demand queries that are executed once. Each query may be represented as a graph of operators. Operators capable of being used in the DSMS include predefined operators (for example, selection, projection, window, join, group, pattern matching, etc.) that are predefined in a system of performing basic query functions, such as filtering, grouping, etc. The operators further include user-defined operators (UDOs) that a user defines and uses as necessary. The UDOs include, for example, an operation of extracting a characteristic of the electrocardiogram (ECG), a signal processing operation such as a noise filter, etc. However, the UDOs require a relatively large amount of computation to acquire accurate results, which leads to an increase in computational overload.

SUMMARY

In one general aspect, there is provided an apparatus of scheduling user-defined operators (UDOs), including a query optimizer configured to receive queries, each of the queries including the UDOs and data streams subject to respective operations of the UDOs, and group the data streams and UDOs into scheduling units, each of the scheduling units including one of the data streams and one of the UDOs. The apparatus further includes a scheduler configured to schedule an execution order in which the scheduling units are executed.

The scheduler is further configured to determine a pruning power of each of the scheduling units. The scheduler is further configured to schedule the execution order based on the pruning power of each of the scheduling units.

The scheduler is further configured to determine the pruning power of each of the scheduling units based on a static parameter including information about a number of UDOs of each of the scheduling units, and/or information about lengths of patterns in a data stream that match the queries for each of the scheduling units.

The scheduler is further configured to determine the pruning power of each of the scheduling units based on a runtime parameter including information about selectivity of pattern matching of each of the scheduling units, and/or information about throughput of each of the scheduling units when a query is executed.

The apparatus further includes a query executing unit configured to execute the scheduling units based on the execution order.

The query executing unit includes query state data storing results of the execution of the scheduling units. The query executing unit is further configured to execute a next scheduling unit based on the query state data.

The results of the execution of the scheduling units include information about the queries matching each beat of a data stream of each of the scheduling units.

Each of the queries further include pattern matching operators, the data streams subject to respective operations of the pattern matching operators.

The query executing unit is further configured to execute the UDOs of each of the respective scheduling units based on the execution order. The query executing unit is further configured to execute the pattern matching operators of each of the respective scheduling units based on results of the execution of the respective UDOs.

The query executing unit includes query state data storing results of the execution of the pattern matching operators, the results of the execution of the pattern matching operators including information about the queries matching results of the execution of the UDOs for each beat of a data stream of each of the scheduling units. The query executing unit is further configured to execute a next scheduling unit based on the query state data.

In another general aspect, there is provided a method of scheduling user-defined operators (UDOs), including receiving queries, each of the queries including the UDOs and data streams subject to respective operations of the UDOs. The method further includes grouping the data streams and the UDOs into scheduling units, each of the scheduling units including one of the data streams and one of the UDOs. The method further includes scheduling an execution order in which the scheduling units are executed.

The scheduling of the execution order includes determining a pruning power of each of the scheduling units. The scheduling of the execution order further includes scheduling the execution order based on the pruning power of each of the scheduling units.

The determining of the pruning power of each of the scheduling units includes determining the pruning power of each of the scheduling units based on a static parameter including information about a number of UDOs of each of the scheduling units, and/or information about lengths of patterns in a data stream that match the queries for each of the scheduling units.

The determining of the pruning power of each of the scheduling units includes determining the pruning power of each of the scheduling units based on a runtime parameter including information about selectivity of pattern matching of each of the scheduling units, and/or information about throughput of each of the scheduling units when a query is executed.

The method further includes executing the scheduling units based on the execution order.

The method further includes executing a next scheduling unit based on results of the execution of the scheduling units.

The results of the execution of the scheduling units include information about the queries matching each beat of a data stream of each of the scheduling units.

Each of the queries further include pattern matching operators, the data streams subject to respective operations of the pattern matching operators.

The executing of the scheduling units includes executing the UDOs of each of the respective scheduling units based on the execution order. The executing of the scheduling units further includes executing the pattern matching operators of each of the respective scheduling units based on results of the execution of the respective UDOs.

The method further includes executing a next scheduling unit based on results of the execution of the pattern matching operators, the results of the execution of the pattern matching operators including information about the queries matching results of the execution of the UDOs for each beat of a data stream of each of the scheduling units.

Other features and aspects may be apparent from the following detailed description, the drawings, and the claims.

BRIEF DESCRIPTION OF THE DRAWINGS

FIGS. 4 and 5 are diagrams illustrating examples of data for an operation of deciding an order in which scheduling units are executed by the apparatus illustrated in FIG. 1.

Figure 1:
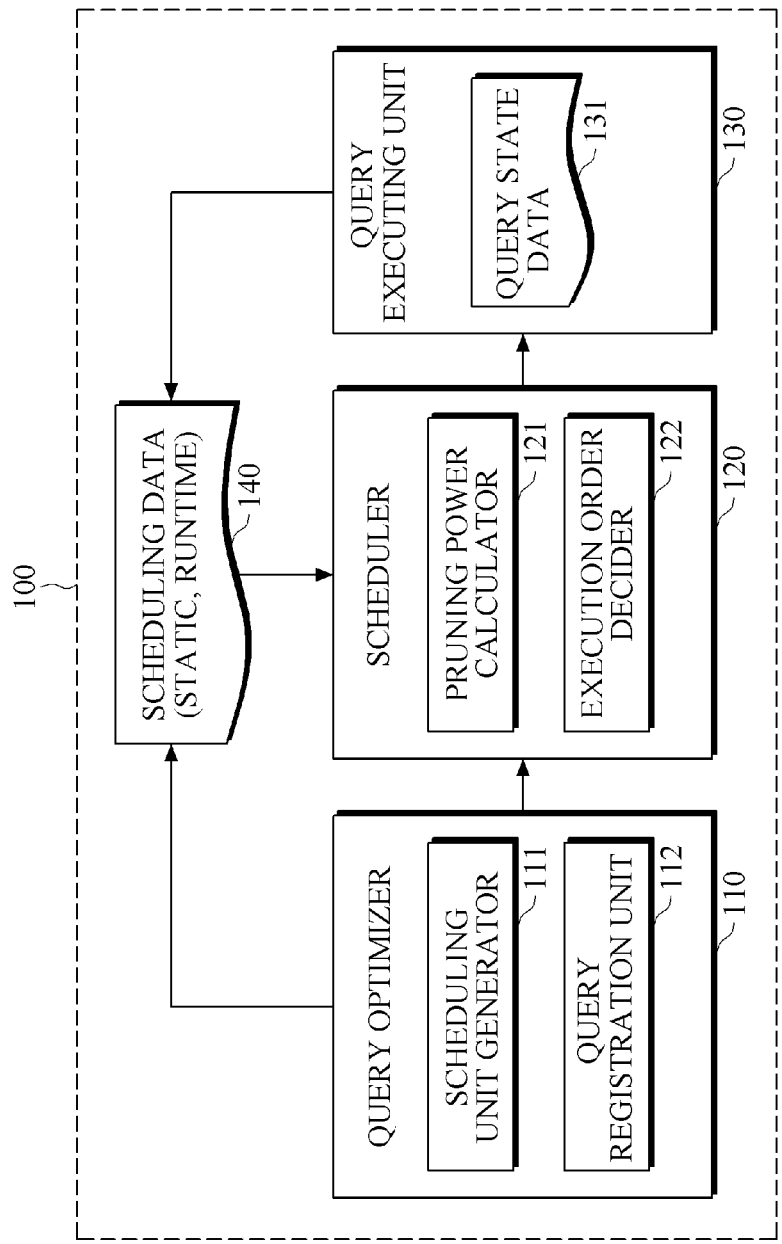
FIG. 1 is a diagram illustrating an example of an apparatus configured to schedule user-defined operators (UDOs) in a data stream management system (DSMS).

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating an example of an apparatus 100 configured to schedule user-defined operators (UDOs) in a data stream management system (DSMS). The apparatus 100 includes a query optimizer 110, a scheduler 120, and a query executing unit 130.

The query optimizer 110 optimizes one or more queries to minimize processing of UDOs requiring a relatively large amount of computation, among operators that may be repeatedly-processed in the DSMS. Each query includes operations of such operators, on one or more data streams. The query optimizer 110 creates one or more scheduling units based on the data streams and the UDOs included in each query.

In more detail, the query optimizer 110 includes a scheduling unit generator 111 and a query registration unit 112. The scheduling unit generator 111 groups the data streams and the UDOs into units, each including a single data stream and a single UDO, to generate the scheduling units. After the scheduling units are generated, the query registration unit 112 calculates static parameters and/or runtime parameters, and registers the static parameters and/or the runtime parameters as scheduling data 140. The static parameters may include, for example, information about a number of UDOs of each scheduling unit, and/or information about lengths of patterns in a data stream that match the queries, for each scheduling unit. The runtime parameters may include, for example, information about a selectivity of pattern matching of each scheduling unit, and/or information about throughput (e.g., a mean execution time) of each scheduling unit.

In this example, the scheduling apparatus 100 stores the scheduling data 140. The scheduling data 140 includes data allowing the scheduler 120 to decide an order in which the scheduling units are executed, and includes the static parameter data and/or the runtime parameter data, as described above. The scheduling data 140 may be created in the form of a table or a linked-list, and may be stored in a memory so as to be used to decide the execution order of the scheduling units in real time.

After the scheduling units are generated, the scheduler 120 decides the order in which the scheduling units are executed. In more detail, the scheduler 120 includes a pruning power calculator 121 and an execution order decider 122. The pruning power calculator 121 calculates a pruning power of each scheduling unit based on the scheduling data 140 including the static parameters and/or the runtime parameters.

The execution order decider 122 decides the order in which the scheduling units are executed based on the pruning powers of the scheduling units. For example, the execution order decider 122 may decide the execution order of the scheduling units to correspond to a descending order of the pruning powers of the scheduling units. Also, the execution order decider 122 may decide an initial execution order of the scheduling units based on only the static parameters. In another example, the execution order decider 122 may decide the initial execution order of the scheduling units in based on both the static parameters and the runtime parameters. In this example, the runtime parameters may include data measured during or before pre-processing of the queries. Also, the execution order decider 122 may change the initial execution order of the scheduling units by again deciding the execution order of the scheduling units based on the runtime parameters when the queries are executed.

The query executing unit 130 executes the UDOs of each scheduling unit based on the execution order of the scheduling units. For example, the scheduling units may be executed step wisely. That is, each scheduling unit may be executed based on the results of the execution of the previous scheduling unit.

In pattern matching queries with data streams, the data streams are synchronized in units of beats, and only when all of the data streams meet pattern matching conditions or operations at the same beat, the results of the pattern matching are reflected as final results. Accordingly, if any one of the data streams do not meet the pattern matching conditions at the same beat as the remaining data streams that meet the pattern matching conditions at the same beat, the results of the pattern matching are not reflected as final results.

In examples, the query executing unit 130 creates the results of the execution of each scheduling unit in the form of query state data 131. The query state data 131 includes information about the queries that match patterns in the data streams after pattern matching has been performed for each beat of a data stream included in each scheduling unit. Based on the query state data 131, the query executing unit 130 executes only the matching queries when the next scheduling unit is executed, which prevents the next scheduling unit from being executed if there is no matching query.

Figure 2:
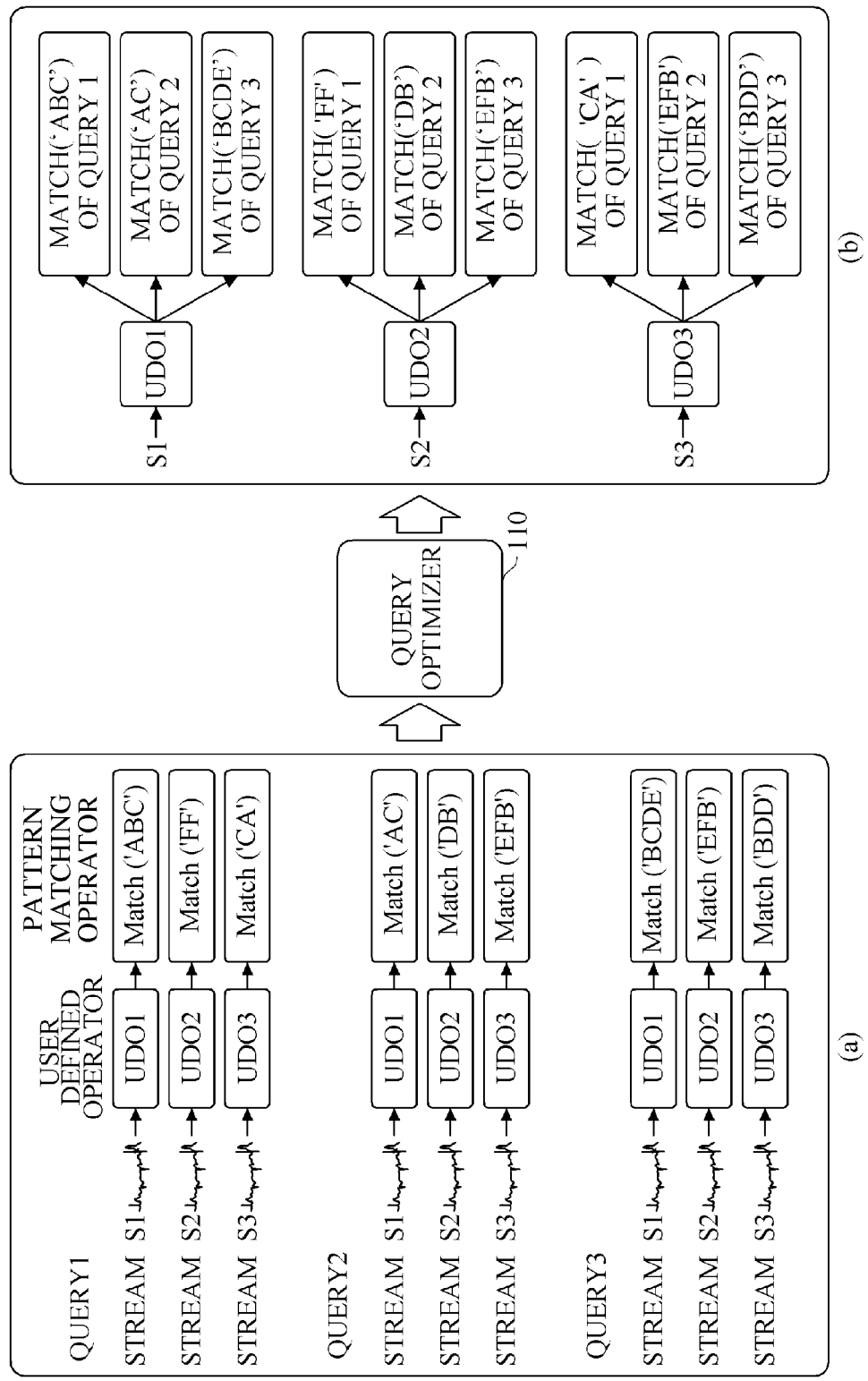
FIG. 2 is a diagram illustrating an example of an operation of query optimization performed by the apparatus illustrated in FIG. 1.

FIG. 2 is a diagram illustrating an example of an operation of query optimization performed by the apparatus 100 illustrated in FIG. 1. The left portion (a) of FIG. 2 shows three queries 1, 2, and 3, each including three streams S1, S2, and S3. The streams S1, S2, and S3 are subject to operations of operators UDO1, UDO2, and UDO3, respectively, and then to operations of pattern matching operators.

The right portion (b) of FIG. 2 shows three scheduling units S1, S2, and S3 created through stream-based grouping (e.g., based on the streams S1, S2, and S3, respectively) by the query optimizer 110. The scheduling units S1, S2, and S3 include the operators UDO1, UDO2, and UDO3, respectively. The scheduling units S1, S2, and S3 further include the pattern matching operators of the streams S1, S2, and S3, respectively. For example, the scheduling unit S1 includes the pattern matching operators of the stream S1, e.g., match ('ABC') of the query 1, match ('AC') of the query 2, and match ('BCDE') of the query 3.

Figure 3:
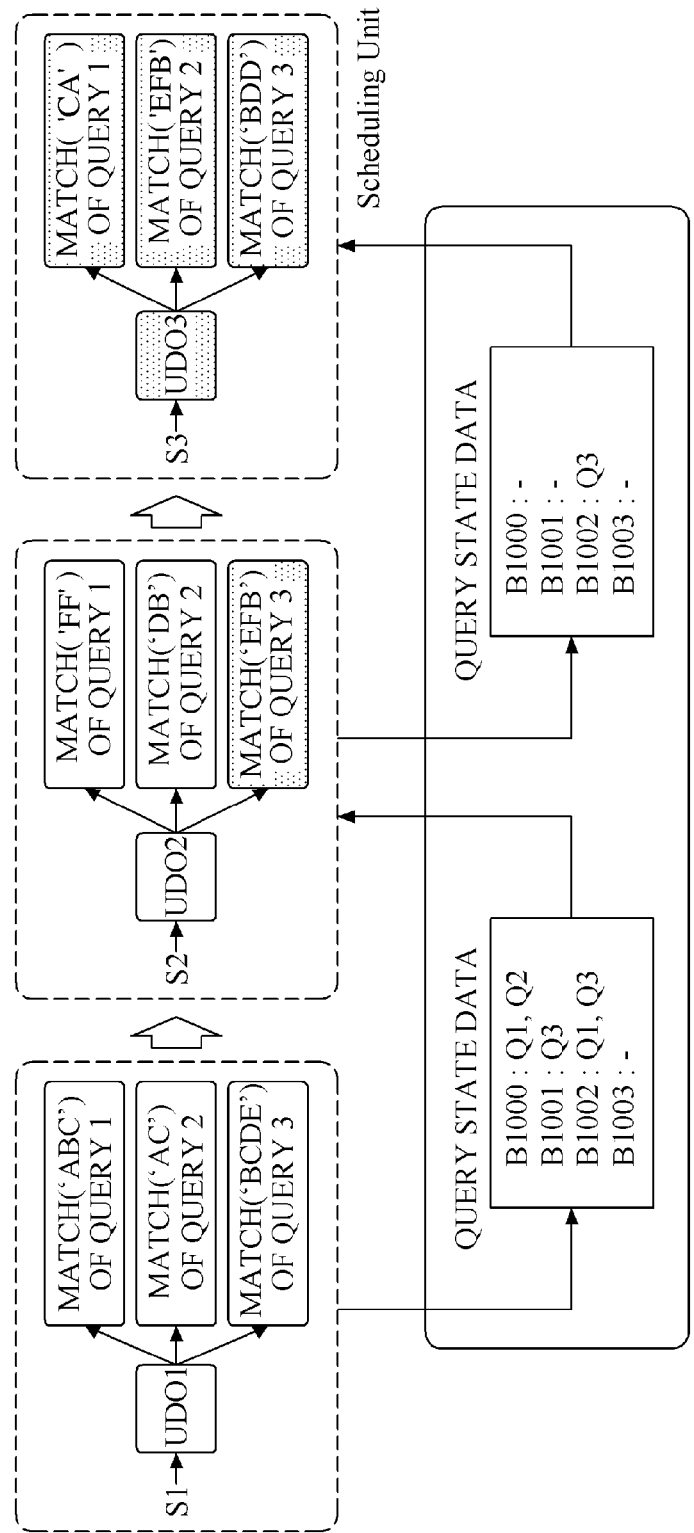
FIG. 3 is a diagram illustrating an example of an operation of executing queries optimized by the apparatus illustrated in FIG. 1.

FIG. 3 is a diagram illustrating an example of an operation of executing queries optimized by the apparatus 100 illustrated in FIG. 1. In more detail, the query executing unit 130 (see FIG. 1) executes the scheduling units S1, S2, and S2, sequentially, in an execution order (S1->S2->S3) of the scheduling units, which is created by the scheduler 120. The query executing unit 130 stores the results of the execution of the scheduling units S1 and S2 as the query state data 131 (see FIG. 1).

In more detail, the query executing unit 130 executes the operator UDO1 of the scheduling unit S1, and executes the pattern matching operators of the scheduling unit S1 based on the results of the execution of the operator UDO1. In this example, the query execution unit 130 executes the pattern matching operators for each beat (e.g., B1000, B1001, B1002, or B1003) of the stream S1, and stores information about a query(s) matching the result of execution of the operator UDO1 for the beat in the query state data 131.

For example, if the result of the execution of the operator UDO1 for the beat B1000 of the stream S1 is 'A', the pattern matching operators of the scheduling unit S1 (e.g., of the queries 1, 2, and 3, or queries Q1, Q2, and Q3, respectively) are executed using the 'A'. The results of the pattern matching include the queries Q1 and Q2 matching the 'A'. Likewise, the same procedure is applied to remaining beats so as to thereby execute the operator UDO1 and the pattern matching operators of the scheduling unit S1. Then, the results of the pattern matching are stored as the query state data 131. In this example, the query state data 131 indicates that the result of the execution of the operator UDO1 for the beat B1000 matches the queries Q1 and Q2, that the result of the execution of the operator UDO1 for the beat B1001 matches the query Q3, that the result of the execution of the operator UDO1 for the beat B1002 matches the queries Q1 and Q3, and that the result of the execution of the operator UDO1 for the beat B1003 does not match any query.

The query executing unit 130 executes the operator UDO2 of the next scheduling unit S2, and executes the pattern matching operators of the scheduling unit S2. In this example, the pattern matching operators of the scheduling unit S2 are executed based on the query state data 131 created by the execution of the previous scheduling unit S1. For example, since the results of the execution of the scheduling unit S1 show that the matching queries of the beat B1000 are the queries Q1 and Q2, in the case of the beat B1000 corresponding to the execution of the scheduling unit S2, the pattern matching operators of the queries Q1 and Q2 are executed, while the pattern matching operator of the query Q3 is not executed. In this example, if the result of execution of the operator UDO2 for the beat B1000 of the stream S2 is 'C', the pattern matching operators of the scheduling unit S2 and of the queries Q1 and Q2 are executed using the 'C'. There are no results of this pattern matching, and thus, information representing that there are no results of this pattern matching (e.g., '-') is stored as the query state data 131.

Likewise, the query executing unit 130 uses the query state data 131 created by the execution of the scheduling unit S2, to execute the scheduling unit S3. For example, since the beat B1000 corresponding to the execution of the scheduling unit S2 indicates no matching queries, the scheduling unit S3 is not executed. As such, when each scheduling unit is executed, by executing pattern matching operators of only a matching query(s) for each beat with reference to query state data 131 created by an execution of the previous scheduling unit, unnecessary UDO computation and unnecessary pattern matching are prevented.

Figure 4:
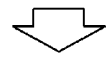

FIGS. 4 and 5 are diagrams illustrating examples of data for an operation of deciding an order in which scheduling units are executed by the apparatus 100 illustrated in FIG. 1. In more detail, FIG. 4 shows examples of static parameters used to calculate pruning power, and stored as the scheduling data 140 (see FIG. 1) by the query registration unit 112 when queries are registered. The (a) portion of FIG. 4 shows information about a number(s) of UDOs U1, U2, and/or U3 for each query Q1, Q2, or Q3, and a sum value and a normalized value for each UDO U1, U2, or U3.

The (b) portion of FIG. 4 shows original and normalized information about lengths of patterns in streams S1, S2, and S3 that match the queries Q1, Q2, and Q3, respectively. The (b) portion of FIG. 4 further shows a sum value and a normalized value of the normalized information of each stream S1, S2, or S3. For example, a pattern 'ABC' is 3 lengths, and a pattern 'AC' is 2 lengths.

FIG. 5 shows examples of runtime parameters used to calculate pruning power. In more detail, the (a) portion of FIG. 5 shows normalized information about pattern matching selectivity for each query Q1, Q2, or Q3 or for each stream S1, S2, or S3. The (a) portion of FIG. 5 further shows a sum value and a normalized value for the normalized information of each stream S1, S2, or S3.

The (b) portion of FIG. 5 shows a mean execution time for each UDO U1, U2, or U3, and normalized and L-normalized values of the mean execution time. The runtime parameters may be measurement results of pre-processing the queries Q1, Q2, and Q3, and are stored as the scheduling data 140 (see FIG. 1). Also, the query executing unit 130 may measure the runtime parameters when executing the queries Q1, Q2, and Q3, and may store the results of the measurement as the scheduling data 140.

The pruning power calculator 121 may calculate the pruning power of each scheduling unit based on the static parameters and/or the runtime parameters stored as the scheduling data 140, as follows.

$$PP = W_U U + W_L L + W_P P + W_T T, \quad (1)$$

where PP is the pruning power of each scheduling unit, U is a number of UDOs of the corresponding scheduling unit, L is a length of patterns in a data stream that match queries for the corresponding scheduling unit, P is a selectivity of pattern matching of the corresponding scheduling unit, T is efficiency of the corresponding scheduling unit, and $W_U$, $W_L$, $W_P$, and $W_T$ are weights.

Examples of calculating pruning powers of scheduling units S1, S2, and S3 by applying values denoted in FIGS. 4 and 5 to equation (1), are shown as equation (2) below. In equation (2), $W_U$, $W_L$, $W_P$, and $W_T$ are weights allocated to the respective parameters.

$$PP_{S1} = 1 \times W_U + 1 \times W_L + 1 \times W_P + 0.75 \times W_T$$

$$PP_{S2} = 0.66 \times W_U + 0.77 \times W_L + 0.76 \times W_P + 0 \times W_T$$

$$PP_{S3} = 0.66 \times W_U + 0.77 \times W_L + 0.52 \times W_P + 0.5 \times W_T \quad (2)$$

Figure 6:
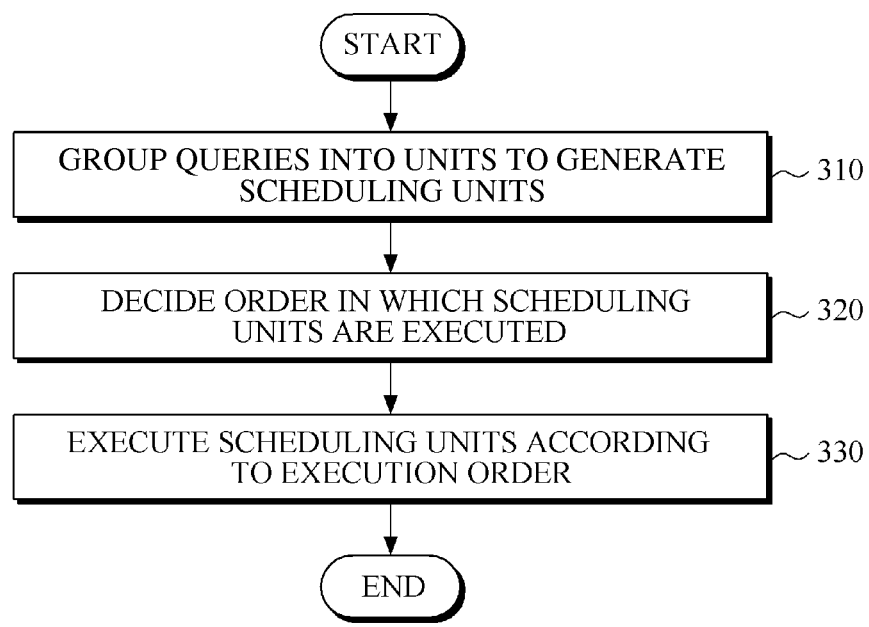
FIG. 6 is a flowchart illustrating an example of a method of scheduling UDOs in a DSMS.
Figure 7:
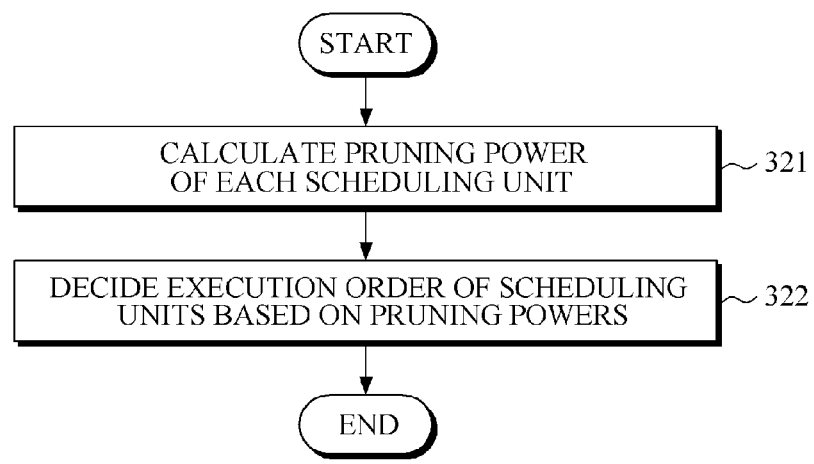
FIG. 7 is a flowchart illustrating an example of an operation of deciding an order in which scheduling units are executed in the method of FIG. 6.

FIG. 6 is a flowchart illustrating an example of a method of scheduling UDOs in a DSMS, and FIG. 7 is a flowchart illustrating an example of an operation of deciding an order in which scheduling units are executed in the method of FIG. 6. The method will be described in detail with reference to FIGS. 1, 6, and 7, below.

Referring to FIG. 6, at operation 310, the query optimizer 110 groups queries into units, each including a single data stream, to generate scheduling units. For example, the query optimizer 110 may group three queries 1, 2, and 3, each including three streams S1, S2, and S3, into units, each including a single data stream, to generate three scheduling units S1, S2, and S3.

At operation 320, the scheduler 120 decides an order in which the scheduling units are executed. Referring to FIG. 7, at operation 321, the scheduler 120 calculates a pruning power of each scheduling unit based on static parameters and/or runtime parameters, as shown in, for example, FIGS. 4 and 5 and the equation 1. For example, the static parameters and runtime parameters may be stored as the scheduling data 140 in the form of a table or a linked-list in a memory so that the static and runtime parameters may be used to calculate the execution order of the scheduling units S1, S2, and S3.

At operation 322, the scheduler 120 decides the execution order of the scheduling units based on the pruning powers of the scheduling units. For example, the execution order of the scheduling units S1, S2, and S3 may be decided corresponding to a descending order of the pruning powers of the scheduling units S1, S2, and S3. Accordingly, streams that may be difficult to match with queries, are preferentially-processed to thereby enhance processing efficiency.

In other examples, the scheduler 120 may decide an initial execution order of the scheduling units S1, S2, and S3 based on only the static parameters, or based on both the static parameters and the runtime parameters. The initial execution order may be changed by again deciding the execution order of the scheduling units S1, S2, and S3 based on the runtime parameters when the corresponding queries are executed.

At operation 330, the query executing unit 130 executes the scheduling units according to the execution order. For example, each scheduling unit may be executed step wisely, or based on the results of the execution of the previous scheduling unit.

In the example as described above with reference to FIG. 3, the query executing unit 130 executes the scheduling units S1, S2, and S3, sequentially, in the execution order (S1->S2->S3) of the scheduling units S1, S2, and S3, which is created by the scheduler 120. The query executing unit 130 stores the results of the execution of the scheduling units S1 and S2 as the query state data 131.

The query state data 131 is referred to when the next scheduling unit S3 is executed. As shown in the first query state data 131 of FIG. 3, the results of the execution of the scheduling unit S1 for the beat B1000 matches the queries Q1 and Q2. Accordingly, when the scheduling unit S2 is executed, the query executing unit 130 executes the pattern matching operators of the queries Q1 and Q2 for the beat B1000 without executing the pattern matching operator of the query Q3 with reference to the first query state data 131. Further, the query executing unit 130 does not execute the scheduling unit S3 for the beat B1000 since the query state information 131 created from the results of the execution of the scheduling unit S2 for the beat B1000 matches no query.

According to the teachings above, there is provided an apparatus and a method of when each scheduling unit is executed, executing pattern matching operators of only a matching query(s) for each beat with reference to query state data 131 created by an execution of the previous scheduling unit. Accordingly, unnecessary UDO computation and unnecessary pattern matching are prevented.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. For example, the software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus of scheduling user-defined operators (UDOs), comprising:
   a processor;
   a query optimizer configured to
      receive queries, each of the queries comprising the UDOs and data streams subject to respective operations of the UDOs, and
      group the data streams and UDOs into scheduling units, each of the scheduling units comprising one data stream of the data streams and a corresponding UDO having operations to be performed on the one data stream among the UDOs; and
   a scheduler configured to schedule an execution order in which the scheduling units are executed.

2. The apparatus of claim 1, wherein the scheduler is further configured to:
   determine a pruning power of each of the scheduling units; and
   schedule the execution order based on the pruning power of each of the scheduling units.

3. The apparatus of claim 2, wherein the scheduler is further configured to:
   determine the pruning power of each of the scheduling units based on a static parameter comprising information about a number of UDOs of each of the scheduling units, and/or information about lengths of patterns in a data stream that match the queries for each of the scheduling units.

4. The apparatus of claim 3, wherein the scheduler is further configured to:
   determine the pruning power of each of the scheduling units based on a runtime parameter comprising information about selectivity of pattern matching of each of the scheduling units, and/or information about throughput of each of the scheduling units when a query is executed.

5. The apparatus of claim 1, further comprising:
   a query executing unit configured to execute the scheduling units based on the execution order.

6. The apparatus of claim 5, wherein:
   the query executing unit comprises query state data storing results of the execution of the scheduling units; and
   the query executing unit is further configured to execute a next scheduling unit based on the query state data.

7. The apparatus of claim 6, wherein the results of the execution of the scheduling units comprise information about the queries matching each beat of a data stream of each of the scheduling units.

8. The apparatus of claim 5, wherein each of the queries further comprise pattern matching operators, the data streams subject to respective operations of the pattern matching operators.

9. The apparatus of claim 8, wherein the query executing unit is further configured to:
   execute the UDOs of each of the respective scheduling units based on the execution order; and
   execute the pattern matching operators of each of the respective scheduling units based on results of the execution of the respective UDOs.

10. The apparatus of claim 9, wherein:
    the query executing unit comprises query state data storing results of the execution of the pattern matching operators, the results of the execution of the pattern matching operators comprising information about the queries matching results of the execution of the UDOs for each beat of a data stream of each of the scheduling units; and
    the query executing unit is further configured to execute a next scheduling unit based on the query state data.

11. A method of scheduling user-defined operators (UDOs), comprising:
    receiving queries, each of the queries comprising the UDOs and data streams subject to respective operations of the UDOs;
    grouping the data streams and the UDOs into scheduling units, each of the scheduling units comprising one data stream of the data streams and a corresponding UDO having operations to be performed on the one data stream among the UDOs; and
    scheduling an execution order in which the scheduling units are executed.

12. The method of claim 11, wherein the scheduling of the execution order comprises:
    determining a pruning power of each of the scheduling units; and
    scheduling the execution order based on the pruning power of each of the scheduling units.

13. The method of claim 12, wherein the determining of the pruning power of each of the scheduling units comprises:
    determining the pruning power of each of the scheduling units based on a static parameter comprising information about a number of UDOs of each of the scheduling units, and/or information about lengths of patterns in a data stream that match the queries for each of the scheduling units.

14. The method of claim 13, wherein the determining of the pruning power of each of the scheduling units comprises:
    determining the pruning power of each of the scheduling units based on a runtime parameter comprising information about selectivity of pattern matching of each of the scheduling units, and/or information about throughput of each of the scheduling units when a query is executed.

15. The method of claim 11, further comprising:
    executing the scheduling units based on the execution order.

16. The method of claim 15, further comprising:
    executing a next scheduling unit based on results of the execution of the scheduling units.

17. The method of claim 16, wherein the results of the execution of the scheduling units comprise information about the queries matching each beat of a data stream of each of the scheduling units.

18. The method of claim 15, wherein each of the queries further comprise pattern matching operators, the data streams subject to respective operations of the pattern matching operators.

19. The method of claim 18, wherein the executing of the scheduling units comprises:
    executing the UDOs of each of the respective scheduling units based on the execution order; and
    executing the pattern matching operators of each of the respective scheduling units based on results of the execution of the respective UDOs.

20. The method of claim 19, further comprising:
    executing a next scheduling unit based on results of the execution of the pattern matching operators, the results of the execution of the pattern matching operators comprising information about the queries matching results of the execution of the UDOs for each beat of a data stream of each of the scheduling units.

21. The apparatus of claim 1, wherein, in response to a same data stream being included in more than one of the received queries, the query optimizer is configured to group the data streams and the UDOs of the queries into the scheduling units based on a stream-based grouping.

* * * * *